Nov. 10, 1959 A. R. BONORDEN 2,912,679

TRANSLATOR

Filed Nov. 29, 1954 4 Sheets-Sheet 1

INVENTOR
A. R. BONORDEN
BY
ATTORNEY

Nov. 10, 1959 A. R. BONORDEN 2,912,679

TRANSLATOR

Filed Nov. 29, 1954 4 Sheets-Sheet 2

INVENTOR
A. R. BONORDEN
BY [signature]
ATTORNEY

Nov. 10, 1959 A. R. BONORDEN 2,912,679

TRANSLATOR

Filed Nov. 29, 1954 4 Sheets-Sheet 3

INVENTOR
A. R. BONORDEN
BY
ATTORNEY

FIG. 4

| CONTACTS ACTUATED FIG.1 | | | | | WINDINGS ENERGIZED FIG.1 | | | | | TRANSFORMER FLUX LEVEL FIG. 3 | | | | | | | | | | INDICATING RELAY ENERGIZED FIG.1 |
|---|---|---|---|---|---|---|---|---|---|---|---|---|---|---|---|---|---|---|---|---|
| | | | | | | | | | | T0 | T1 | T2 | T3 | T4 | T5 | T6 | T7 | T8 | T9 | |
| | | | | C0 | | | | | W0 | Q1 | P1 | P1 | Q1 | P1 | Q1 | Q1 | P1 | Q1 | Q1 | — |
| | | | | C1 | | | | | W1 | Q1 | P1 | Q1 | P1 | Q1 | P1 | Q1 | Q1 | P1 | Q1 | — |
| | | | | C2 | | | | | W2 | Q1 | Q1 | P1 | P1 | Q1 | Q1 | P1 | Q1 | Q1 | P1 | — |
| | | | | C4 | | | | | W4 | P1 | Q1 | Q1 | Q1 | P1 | P1 | P1 | Q1 | Q1 | Q1 | — |
| | | | | C7 | | | | | W7 | P1 | Q1 | Q1 | Q1 | Q1 | Q1 | Q1 | P1 | P1 | P1 | — |
| | | | C0 | C1 | | | | W0 | W1 | Q2 | P2 | P0 | P0 | P0 | P0 | Q2 | P0 | P0 | Q2 | IPR1 |
| | | | C0 | C2 | | | | W0 | W2 | Q2 | P0 | P2 | P0 | P0 | Q2 | P0 | P0 | Q2 | P0 | IPR2 |
| | | | C1 | C2 | | | | W1 | W2 | Q2 | P0 | P0 | P2 | Q2 | P0 | P0 | Q2 | P0 | P0 | IPR3 |
| | | | C0 | C4 | | | | W0 | W4 | P0 | P0 | P0 | Q2 | P2 | P0 | P0 | P0 | Q2 | Q2 | IPR4 |
| | | | C1 | C4 | | | | W1 | W4 | P0 | P0 | Q2 | P0 | P0 | P2 | P0 | Q2 | P0 | Q2 | IPR5 |
| | | | C2 | C4 | | | | W2 | W4 | P0 | Q2 | P0 | P0 | P0 | P0 | P2 | Q2 | Q2 | P0 | IPR6 |
| | | | C0 | C7 | | | | W0 | W7 | P0 | P0 | P0 | Q2 | P0 | Q2 | Q2 | P2 | P0 | P0 | IPR7 |
| | | | C1 | C7 | | | | W1 | W7 | P0 | P0 | Q2 | P0 | Q2 | P0 | Q2 | P0 | P2 | P0 | IPR8 |
| | | | C2 | C7 | | | | W2 | W7 | P0 | Q2 | P0 | P0 | Q2 | Q2 | P0 | P0 | P0 | P2 | IPR9 |
| | | | C4 | C7 | | | | W4 | W7 | P2 | Q2 | Q2 | Q2 | P0 | P0 | P0 | P0 | P0 | P0 | IPR0 |
| | | C0 | C1 | C2 | | | W0 | W1 | W2 | Q3 | P1 | P1 | P1 | Q1 | Q1 | Q1 | Q1 | Q1 | Q1 | — |
| | | C0 | C1 | C4 | | | W0 | W1 | W4 | Q1 | P1 | Q1 | Q1 | P1 | P1 | Q1 | Q1 | Q1 | Q3 | — |
| | | C0 | C1 | C7 | | | W0 | W1 | W7 | Q1 | P1 | Q1 | Q1 | Q1 | Q1 | Q3 | P1 | P1 | Q1 | — |
| | | C0 | C2 | C7 | | | W0 | W2 | W7 | Q1 | Q1 | P1 | Q1 | Q1 | Q3 | Q1 | P1 | Q1 | P1 | — |
| | | C1 | C2 | C4 | | | W1 | W2 | W4 | Q1 | Q1 | Q1 | P1 | Q1 | P1 | P1 | Q3 | Q1 | Q1 | — |
| | | C1 | C4 | C7 | | | W1 | W4 | W7 | P1 | Q1 | Q3 | Q1 | Q1 | P1 | Q1 | Q1 | P1 | Q1 | — |
| | | C2 | C4 | C7 | | | W2 | W4 | W7 | P1 | Q3 | Q1 | Q1 | Q1 | Q1 | P1 | Q1 | Q1 | P1 | — |
| | | C1 | C2 | C7 | | | W1 | W2 | W7 | Q1 | Q1 | Q1 | P1 | Q3 | Q1 | Q1 | Q1 | P1 | P1 | — |
| | C0 | C1 | C2 | C4 | | W0 | W1 | W2 | W4 | Q2 | P0 | P0 | P0 | P0 | P0 | P0 | Q2 | Q2 | Q2 | — |
| | C0 | C1 | C2 | C7 | | W0 | W1 | W2 | W7 | Q2 | P0 | P0 | P0 | Q2 | Q2 | Q2 | P0 | P0 | P0 | — |
| | C0 | C1 | C4 | C7 | | W0 | W1 | W4 | W7 | P0 | P0 | Q2 | Q2 | P0 | P0 | Q2 | P0 | P0 | Q2 | — |
| | C0 | C2 | C4 | C7 | | W0 | W2 | W4 | W7 | P0 | Q2 | P0 | Q2 | P0 | Q2 | P0 | P0 | Q2 | P0 | — |
| | C1 | C2 | C4 | C7 | | W1 | W2 | W4 | W7 | P0 | Q2 | Q2 | P0 | Q2 | P0 | P0 | Q2 | P0 | P0 | — |
| C0 | C1 | C2 | C4 | C7 | W0 | W1 | W2 | W4 | W7 | Q1 | Q1 | Q1 | Q1 | Q1 | Q1 | Q1 | Q1 | Q1 | Q1 | — |

INVENTOR
A. R. BONORDEN
BY
ATTORNEY

United States Patent Office 2,912,679

Patented Nov. 10, 1959

2,912,679

TRANSLATOR

Allen R. Bonorden, Plainfield, N.J., assignor to Bell Telephone Laboratories, Incorporated, New York, N.Y., a corporation of New York Application November 29, 1954, Serial No. 471,684

3 Claims. (Cl. 340—174)

This invention relates to code translating circuits, and more particularly to an improved code translating circuit including means for insuring the accuracy of translation.

Codes and code translating devices are necessary in many applications in telephone switching and related fields. The present invention is useful generally in translating certain codes in which digits or characters expressed in a plural element code are translated to their unitary equivalents. In one of such codes, the so-called two-out-of-five code, five elements taken two at a time may be translated to provide the ten combinations representing the decimal digits. Any single error occasioned by the undesired activation of, or failure, to activate an element, will result in either one or three elements being activated, which condition is then utilized in applicant's invention to prevent erroneous translations.

An exemplary device employing the two-out-of-five code, in which the present invention may be incorporated, is the automatic telephone message accounting system. In one aspect of this system, information recorded by coded perforations in a paper tape is passed through a reader having sensing pins associated with electrical contacts which sense the presence or absence of perforated areas in the tape. For any group of five sensing pins allocated to the sensing of a digit perforated in a line across the tape, two and, only two, pins should encounter perforations. If one, or more than two pins in the group encounter perforations, an error is present.

In the prior art, these errors are detected by a plurality of relays, the contacts of which provide ten different closures corresponding to the ten desired combinations of the five elements. Such an arrangement may require as many as seventy-six springs and thirty-eight operating contacts on the relays to detect the errors.

One object of this invention, therefore, is a code translator which is provided with means for determining whether the correct number of elements in a plural element code are active. A feature of the invention is the use of magnetically saturated transformers, thereby obviating the necessity for complex check relays.

A further object of the invention is a code translator which is adapted to translate the two-out-of-five code to the one-in-ten decimal code, and to do so when two, and only two, code elements of the five are activated.

These and other objects and features may be accomplished by the use of ten transformers, each representing a digit, and each selectively wound with five primary coils, two coils wound in one direction and three in the other in accordance with the two-out-of-five code expression of the digit represented by the transformer. In addition to the five primary windings, a bias winding and a secondary, or pick-up, winding are wound on each core. The bias winding is serially connected between cores and introduces a saturating flux in each core.

The secondary or pick-up winding on each core may be connected to a common check relay, or alternatively to individual indicating relays. When the invention is used generally as a means for ascertaining that the correct number of elements in the code have been activated, the outputs of all the secondary windings are joined to a common check relay. If the code translation aspect of the invention is desired, namely, the ability to translate from a plural element code to a unitary code, the outputs of the respective secondary windings are connected to individual indicating relays.

The above objects and features of the invention will be more readily understood by reference to the accompanying description and drawing in which:

Fig. 1 shows a circuit embodying the invention in conjunction with the reader circuit of a record controlled reproducing system similar to that shown in the W. W. Carpenter Patent No. 2,669,304, dated February 16, 1954, in which the present invention may be utilized by way of example as a two-out-of-five to one-in-ten code translator, featuring the ability to prevent an erroneous translation in the event an incorrect number of elements in a code are activated;

Fig. 2 shows a circuit in which the invention is employed as a means for ascertaining that the proper number of elements in the code are active, used in conjunction with a record controlled assembler circuit similar to that shown in the W. W. Carpenter et al. Patent 2,558,476, dated June 26, 1951;

Fig. 4 is a tabular representation of various combinations of sensing pin contact closures, resultant flux levels in the toroidal cores, and the respective indicating relays IPR0 . . . IPR9 of Fig. 1 energized thereby.

Figure 1:
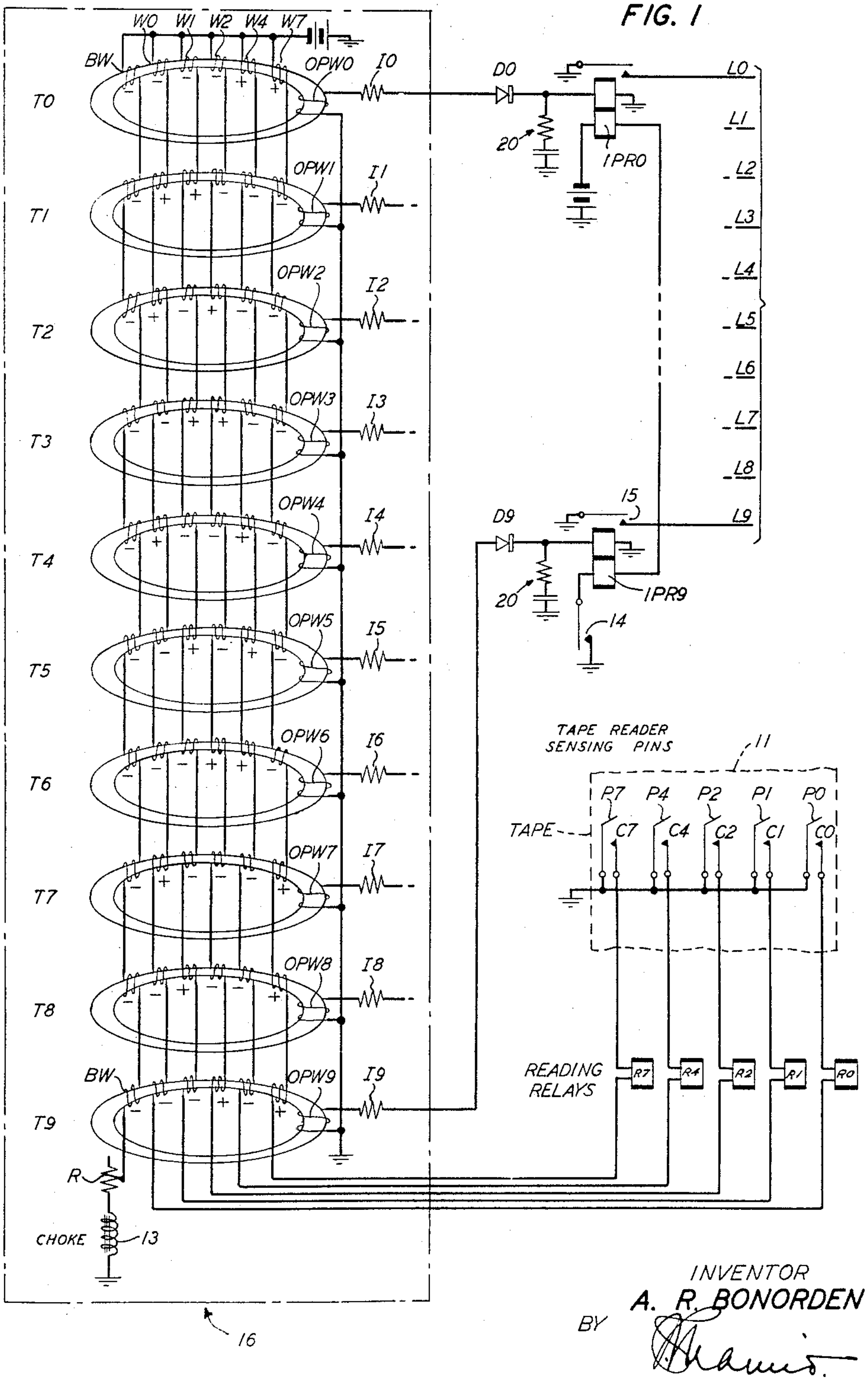

Referring now to Fig. 1, a section of perforated paper tape such as ordinarily used in telephone message accounting systems, is indicated at 11. Associated with this tape are sensing pins P0, P1, P2, P4 and P7. Electrical contacts C0, C1, C2, C4 and C7 are actuated when sensing pins P0, P1, P2, P4 and P7, respectively, drop into perforations in the paper tape 11. Reading relays R0, R1, R2, R4 and R7 are individually connected to contacts C0, C1, C2, C4 and C7, respectively, and are operated when said contacts are closed. These relays, when operated in the two-out-of-five code to express each of the ten decimal values, function to convey the digits to other circuits not shown. The reading relays R0 . . . R7 are, in turn, connected to five coils W0, W1, W2, W4 and W7 on each of ten toroidal cores T0 . . . T9, and these coils are selectively so wound on each of said cores, that the two coils which represent the active elements of the code for the digital value for which the core is reserved are wound in one direction while the other three coils are wound in the opposite direction.

The configuration of the coils W0 . . . W7 on the cores T0 . . . T9 is such that the operation of any two, but only two, of the contacts C0 . . . C7 will serve to activate the output coil OPW– of a single core. Output coils OPW0 . . . OPW9 are mounted on the respective toroidal cores T0 . . . T9. Also serially wound on each core is a bias coil BW which serves to introduce a continuous flux reference level which is altered by the fluxes induced in the cores by the coils W0 . . . W7. The flux level induced in the cores by the bias coil BW is regulated by the variable impedance R connected to said bias winding. Serially connected between the variable impedance R and ground is an inductive choke 13 which functions to reduce to a very low value the mutual inductive effect between the toroidal transformers, insofar as the common bias coil on each is concerned.

One side of each output coil OPW0 . . . OPW9 is connected to ground, and the other side is connected to an impedance I0 . . . I9. Serially connected to each of these impedances are the diodes D0 . . . D9, which are, in turn, connected to indicating relays IPR0 . . . IPR9, of which relays IPR0 and IPR9 only are shown. These relays may be of the polar type with magnetically biased reed contacts. It may be seen that the activation of a particular output coil OPW– will activate the corresponding indicating relay IPR–, thereby closing its contacts, which will remain closed until contact 14 is closed to ground by any suitable means, thereby causing a depolarizing current to flow through the lower winding of each of the relays IPR0 . . . IPR9 which will release any of the relays that are in an operated condition. Other polar or sensitive neutral relays may also be used if arranged to lock in the operated condition by circuitry well known in the art.

The activation of an indicating relay IPR0 . . . IPR9 activates its associated output lead L0 . . . L9, thereby indicating the decimal code of the particular two-in-five combination of holes across the paper tape 11 which resulted in the operation of the involved indicating relay.

Figure 2:
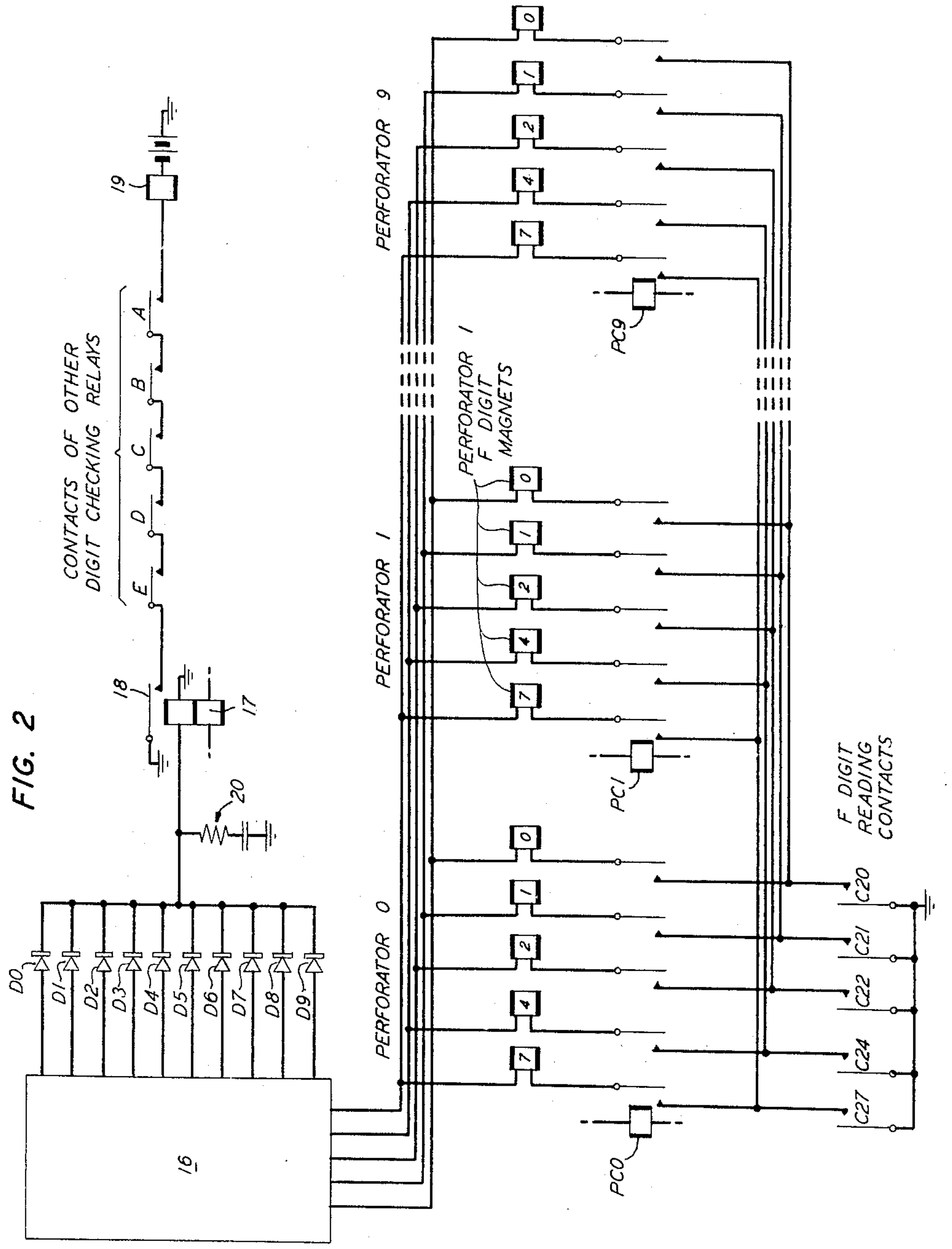

Fig. 2 discloses an exemplary embodiment of the invention in the form of a two-out-of-five check circuit, used in conjunction with the circuit shown in the W. W. Carpenter et al. Patent 2,558,476, referred to above.

In this embodiment, the F digit perforator magnets, and the checking means associated therewith are shown. Reading contacts C20, C21, C22, C24 and C27 are provided, only two of which should close in any given operation. Ten perforator cut-in relays PC0 . . . PC9, of which only three are shown, operate selectively in accordance with control means, not shown, to actuate their associated contacts, thereby closing the reader circuit to the one of the ten perforators controlled by the operated cut-in relay. The corresponding output leads of all of the perforators are joined and connected into the transformer network 16 shown in detail in Fig. 1. The output coils of each transformer are connected, as in Fig. 1, through impedances to diodes D0 . . . D9. In Fig. 2, however, the diodes D0 . . . D9 are all connected to the same digit check relay 17 rather than to individual indicating relays as in Fig. 1. Digit check relay 17 is illustrated in this embodiment as the check relay for the F digit. The contacts 18 of said relay are connected in series with corresponding contacts on the E, D, C, B and A digit check relays (not shown) and finally to the perforator check relay 19. The further operation of the arrangement shown in Fig. 2 will be described later.

Figure 3:
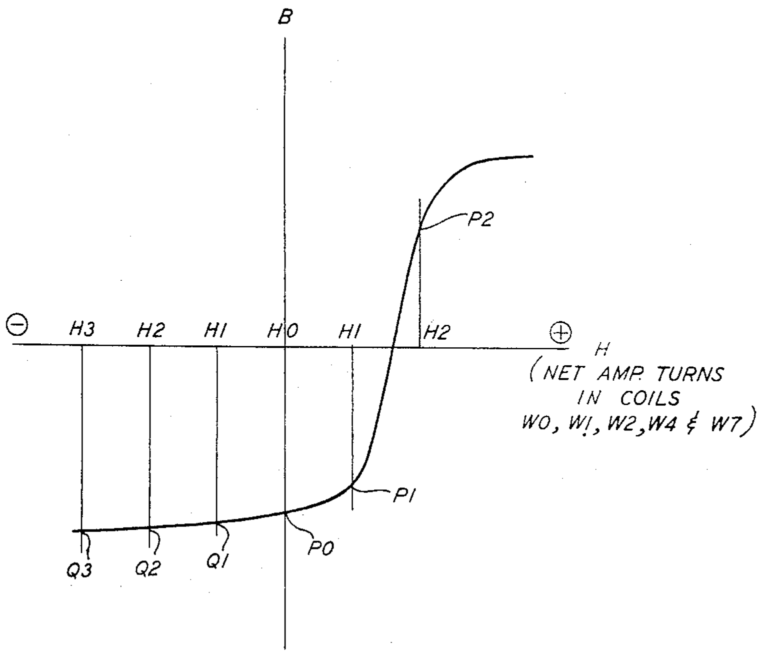
Fig. 3 shows the BH curve of a representative toroidal core of Fig. 1.

Referring now to Fig. 3, a graphical representation of the BH characteristic of one of the toroidal cores of Fig. 1 is shown. It is desirable that the ferric material comprising the toroidal cores have negligible hysteresis loss. Hence, for the sake of simplicity in explanation, slight deviations from the BH curve due to hysteresis may be disregarded without departing from the principles of operation.

The quiescent flux level occasioned by the ampere turns in the bias winding BW is shown at point P0. If only one of the sensing fingers encounters a perforation, closing only its associated contacts, the passage of current through the selected winding will produce a flux level as indicated at either point P1 or point Q1 depending on the direction of current flow through the involved winding. This may be illustrated by referring to toroidal core T3, for example, in Fig. 1. If winding W2 in said toroidal core is activated, the flux generated by said winding will oppose the flux occasioned by bias winding BW and the resultant flux level will be shown at point P1 in Fig. 3. If winding W4 in toroidal core T3 is energized, the flux generated by bias winding BW will be additive to the flux generated by winding W4, and the resultant flux level will be that shown at point Q1 in Fig. 3. The change in flux from P0 to P1 or from P0 to Q1 will occasion a pulse of current in the output winding OPW3, not sufficient, however, to operate the associated relay.

Now consider the case in which at least two windings W– are activated. Again referring to toroidal core T3, it will be seen that if windings W1 and W2 are energized, the resultant ampere turns of windings W1 and W2 will aid each other, but the total additive flux of said windings and the bias flux of winding BW will result in a flux level indicated at point P2 in Fig. 3. This rapid change of flux from level P0 to level P2 will occasion a pulse of current in the output winding OPW3 which is sufficient to operate the associated relay IPR3 (not shown).

If any two windings other than W1 and W2 are energized on core T3, the resultant flux level therein cannot reach level P2 and, therefore, no substantial current pulse will pass through output winding OPW3. To illustrate this fact, it will be seen that if windings W1 and W0 are activated, their resultant fluxes will substantially cancel each other and the resultant flux level in transformer T3 will remain at point P0. If windings W4 and W7 are energized, their additive fluxes will aid the bias winding flux and the resultant level in transformer T3 will be at point Q2 in Fig. 3. The same analysis may be made of other combinations of two windings on transformer T3 and the resulting conclusion will be that the only time the flux level reaches point P2 is when windings W1 and W2 are energized. Any other combination of two windings on core T3 will result in a flux level of Q2 or P0.

Passing, now, to the case where more than two contacts of the group C0 . . . C7 are energized, it will be seen that if three windings W1, W2 and W0, for example, are energized as a result of pins P1, P2 and P0 sensing perforations in the paper, the resultant flux in toroidal core T3 will be that sown at point P1 in Fig. 3. If windings W0, W1, W2 and W4 are energized, the fluxes of these windings will substantially cancel each other, and the flux level will be that shown at point P0 in Fig. 3. If all five windings W0 . . . W7 are energized, the resultant flux level will be that shown at point Q1. Other combinations of windings on toroidal core T3 may be given, but in each case it will be seen that any combination of more than two windings or less than two windings cannot produce the flux level indicated by point P2 in Fig. 3.

Toroidal core T3 has been used for illustrative purposes, but it will be seen that the same analysis is equally applicable to all of the other toroidal cores shown in Fig. 1.

Using the preceding explanation as a basis, and referring to Fig. 4, it is evident that for any combination of closures of contacts C0, C1, C2, C4 and C7 greater than two or less than two, no output indication will be received on any of the indicating polar relays IPR0 . . . IPR9. Fig. 4 is a tabular representation of all possibilities of contact closures clearly outlining the fact that the transformer flux level can only reach point P2 and consequently operate the associated indicating relay, when, and only when, two contacts are actuated.

Having thus described the component structure of the invention, the operation of the invention as a whole may be described as follows:

Referring again to Fig. 1, assume that reader sensing pins P2 and P7 have encountered perforations in the paper tape 11. They will accordingly drop into said perforations, actuating contacts C2 and C7. A circuit is then established from ground through contacts C2 and C7, the windings of relays R2 and R7, respectively, coils W2 and W7, respectively, in each of the toroidal cores T9 . . . T0, to negative battery. Activation of coils W2 and W7 will produce additive magnetic fluxes in toroidal core T9 only, since on no other core are they wound to aid each other. In every other core, the flux changes induced by the passage of current through said coils are either zero or too small to produce an output pulse sufficiently great to operate the associated relay IPR–, as previously explained with reference to Fig. 3. The activation of coils W2 and W7 on core T9, therefore, will produce an output pulse only in output coil OPW9. This pulse is transmitted through impedance I9, diode D9, the operating winding of relay IPR9, to ground. The combination of the diode D9 and resistor-capacitor network 20 provides means for storing the energy of the short pulse and thereby assures the useful dissipation of the energy through the relay winding. The diode also neutralizes the effect of the reverse pulse occurring when the reader contacts open. The contacts 15 of relay IPR9 are closed when the relay operates, applying ground to output lead L9 as an indication that the decimal digit 9 is the code represented by the particular two-out-of-five combination 2 and 7 sensed by the pins P2 and P7. Contacts 15 will remain closed after they are once actuated due to the magnetically biased operation of indicating relay IPR9. In order to release contacts 15, contacts 14 are momentarily closed, thereby sending a momentary depolarizing current through the lower winding of all of the indicating relays. The circuit is then ready to make another two-out-of-five to one-in-ten code translation.

Passing now to the operation of the arrangement shown in Fig. 2, let it be assumed that the digit 5 represented by the two-out-of-five code perforations, positions 1 and 4 of the tape, being sensed is to be perforated on a paper tape (not shown) by perforator 1. In this case, perforator cut-in relay PC1 will have been energized, closing its associated contacts. Reader contacts C21 and C24 will, when perforated positions 1 and 4 are sensed, be actuated. Current may then be traced from ground through contacts C21 and C24, involved contacts on relay PC1, through the windings of magnets 1 and 4 of perforator 1, and serially through windings W1 and W4 on all transformers T9 . . . T0 of Fig. 1, to negative battery. Reference to Figs. 3 and 4 and the descriptions thereof previously given indicates that the excitation of windings W1 and W4 will produce a flux level of P2 in transformer T5, initiating thereby a current pulse in the output winding OPW5 of transformer T5. This current pulse will pass through diode D5 and the upper winding of F digit-check relay 17 to ground, operating said relay and closing contacts 18. If the corresponding contacts of digit-check relays E, D, C, B and A are also operated by their associated and similar checking means, a circuit will be established through perforator check relay 19, to negative battery. Operation of perforator check relay 19 indicates that each of the digits B through F have been represented in the two-out-of-five code by two and only two perforations on the tape being sensed, and that the A digit has been correctly represented in its own code. The operation of relay 19 completes circuits whereby the tape is advanced to the next line of perforations.

At this point it may be noted that the diodes D0 . . . D9 likewise function to permit current flow through relay 17 in only one direction. This prevents the premature release of the relay if it has been previously operated, by the reverse current pulse produced when the reader contacts C21 . . . C27 open.

As similarly considered previously in relation to the circuit of Fig. 1, if any number of reader contacts C20 . . . C27 greater than two or less than two are closed, the digit-check relay 17 will not operate, thereby preventing the operation of the perforator check relay 19. For example, if contacts C20, C21 and C22 are closed, the flux level in each transformer T0 . . . T9 is the same as when contacts C0, C1 and C2 are closed in the circuit of Fig. 1 and in no transformer is it higher than the level indicated by P1 in Fig. 3 (as tabulated for each transformer in Fig. 4). Since the flux level does not reach the level P2 in any transformer, no output pulse will be produced, and F digit-check relay 17 will not operate, a result that also follows if but contact C21 alone closes, if four contacts close, and if five contacts close, as tabulated in Fig. 4.

While I have illustrated my invention by particular embodiments thereof, said invention is not limited in its application to the specific apparatus and particular arrangements therein disclosed. Various applications, modifications, and arrangements of the invention will readily occur to those skilled in the art.

The terms and expressions which I have employed in reference to the invention are used as terms of description and not of limitation, and I have no intention in the use of such terms and expressions of excluding equivalents of the features shown and described or parts thereof but, on the contrary, intend to include therein any and all equivalents, modifications and adaptations which may be employed without departing from the spirit of the invention.

What is claimed is:

1. A translator circuit comprising a plurality of transformers each having biasing means including a bias winding and a plurality of input windings, corresponding input windings on each transformer being serially connected therebetween and wound on each transformer in one direction or another according to a code expressing a digit or a character, means for selectively delivering pulses of current through a predetermined number of said input windings, an output winding on each of said transformers, said windings on each of said transformers being respectively wound to prevent an output in said output winding in response to the delivery of pulses of current to a number of said input windings greater or smaller than said predetermined number, and indicating means individually connected to each of said output windings for producing a signal expressing the digit or character represented by said input pulses only if said pulses of current represent a digit or character in said code.

2. A translator circuit in accordance with claim 1 wherein said indicating means includes magnetically polarized relays individually connected to said output windings, and rectifying means interposed between each of said output windings and each of said relays to insure passage of current through said output windings in only one direction.

3. A translator circuit in accordance with claim 2 wherein each of said magnetically polarized relays comprises an operating winding and a demagnetizing winding, and means for energizing said demagnetizing winding for releasing a previously operated relay.

References Cited in the file of this patent

UNITED STATES PATENTS

| | | |
|---|---|---|
| 1,812,202 | Dowling | June 30, 1931 |
| 2,053,156 | Livingston | Sept. 1, 1936 |
| 2,484,226 | Holden | Oct. 11, 1949 |
| 2,518,022 | Keister | Aug. 8, 1950 |
| 2,550,600 | Rehm | Apr. 24, 1951 |
| 2,586,657 | Holt | Feb. 19, 1952 |
| 2,637,017 | Holden | Apr. 28, 1953 |
| 2,682,573 | Hunt | June 29, 1954 |
| 2,691,153 | Rajchman | Oct. 5, 1954 |
| 2,719,773 | Karnaugh | Oct. 4, 1955 |
| 2,733,424 | Chen | Jan. 31, 1956 |
| 2,734,182 | Rajchman | Feb. 7, 1956 |
| 2,741,757 | Devol et al. | Apr. 10, 1956 |

OTHER REFERENCES

Publication: Electronic Engineering, May 1954, pages 192–199.